United States Patent Office 3,639,361
Patented Feb. 1, 1972

3,639,361
FLUOROCYANOACRYLATES
Jerry E. Robertson, North Oaks, Joseph Kenneth Harrington, Edina, and Elden H. Banitt, Woodbury Township, Washington County, Minn., assignors to Minnesota Mining & Manufacturing Company, St. Paul, Minn.
No Drawing. Filed Dec. 1, 1967, Ser. No. 687,111
Int. Cl. C08f 3/42
U.S. Cl. 260—78.4                                   12 Claims

ABSTRACT OF THE DISCLOSURE

Fluorinated cyanoacrylates having the formula $$CH_2=\overset{CN}{\underset{|}{C}}-CO_2-\overset{R}{\underset{|}{CH}}-CF_2R'$$

wherein R is hydrogen, methyl or ethyl, R' is fluorine, $-CF_3$ or $-(CF_2)_nH$, and $n$ is an integer from 1 to 3 have been found to be useful adhesives which when applied as monomers to adherends rapidly polymerize in the presence of even small amounts of e.g. moisture to form strong bonds. The monomers also polymerize to films and can be used biologically as hemostatics and tissue adhesives.

FIELD OF THE INVENTION

This invention relates to compositions which polymerize to form coatings and adhesives. More particularly, the invention relates to fluorine-containing cyanoacrylate monomers which polymerize rapidly upon contact with basic materials, e.g. moisture in the air, to form polymers which are suitable for biological application, i.e. to bond or coat living mammalian tissues.

The fluorinated 2-cyanoacrylates of this invention are useful in adhesive compositions and are particularly useful as biological adhesives and hemostatic agents. Thus, new approaches to the joining together of mammalian tissues, as well as for arresting the escape of blood therethrough, are possible by the use of these novel monomers. For example, satisfactory hemostasis of splenic and liver wounds, heretofore to a great extent unrepairable by conventional methods, is obtained by the application and polymerization of a thin film of fluorinated 2-cyanoacrylate monomer on the injured surface. The bonding strength, absorbability by the tissues, hemostatic capability and low degree of local inflammation resulting when these monomers are applied in vivo, are properties which make them especially valuable for biological applications.

PRIOR ART

Known non-fluorinated alkyl 2-cyanoacrylates, particularly the methyl, isobutyl and n-butyl 2-cyanoacrylates, have been investigated for use as biological adhesives, see, e.g. Medical World News, 8 (20), 41 (1967); Mfg. Chemist, 38 (8), 94 (1967); Technical Report 6618, Walter Reed Army Medical Center, December 1966. While the unsubstituted alkyl monomers appear to possess the requisite bonding and hemostatic properties when applied to damaged mammalian tissues, these materials appear to fail to have the required properties of low toxicity and adequate absorption by the tissues. Methyl 2-cyanoacrylate, for example, gives rise to a severe inflammatory tissue response at the site of application. The n-butyl and isobutyl 2-cyanoacrylate monomers are not absorbed well (if at all) by the tissues and polymeric residue of the adhesive has been observed by histologic examination of the site of application as much as twelve months after surgery, see, e.g. Medical World News, 8 (29), 27 (1967).

It is accordingly an object of this invention to provide new monomers which are suitable for use in biological adhesive compositions and which form adhesive bonds which do not significantly interfere with natural healing of injured mammalian tissues, are readily assimilated by the body with minimal toxic effects, and are autopolymerizable in the presence of blood and other body fluids.

The present invention also contemplates providing new monomeric adhesives which can be used alone, or in conjunction with each other or in conjunction with unsubstituted alkyl 2-cyanoacrylates in the bonding of damaged mammalian tissue or in preventing the escape of blood or other fluids therethrough and which are autopolymerizable in thin film on said tissue. Comonomer compositions are of interest for specific uses because they may provide advantageous combinations of properties not completely embodied in individual monomers.

A further object of this invention is to provide new monomeric adhesives which can be used either alone or as comonomers in the bonding of similar or dissimilar materials without the use of heat or catalyst during the bonding operation.

Other objects will be apparent from the description and claims which follow, e.g. the prepartion of polymers.

SUMMARY OF THE INVENTION

The present invention is based on the discovery that the replacement of hydrogen atoms in the alcoholic residue of 2-cyanoacrylate esters with fluorine atoms unexpectedly renders these monomers substantially better tolerated by living tissue than are the hydrocarbon monomers.

The class of monomeric 2-cyanoacrylate esters which comprises this invention is represented by the structural formula $$CH_2=\overset{CN}{\underset{|}{C}}-CO_2-\overset{R}{\underset{|}{CH}}-CF_2R'$$

wherein R is a member of the group consisting of hydrogen, methyl or ethyl and R' is a member of the group consisting of fluorine, $-(CF_2)_nH$ and $CF_3$ and $n$ is an integer from 1 to 3. These new fluorinated monomers when employed in biological adhesive compositions, individually or as comonomers, exhibit excellent skin wound adhesion and hemostasis; they are well assimilated by the tissues at an acceptable rate, and their use, particularly in the case of the monomers in which the $$-\overset{R}{\underset{|}{CH}}-CF_2R'$$

radical is $-CH_2(CF_2)_4H$-1,1,5-trihydroperfluoropentyl 2-cyanoacrylate, $-CH_2CF_2CF_3$-1,1-dihydroperfluoropropyl 2-cyanoacrylate, $-CH_2(CF_2)_2H$-1,1,3-trihydroperfluoropropyl 2-cyanoacrylate and $-CH(CH_3)CF_3$-2-(1,1,1-trifluoro)propyl 2-cyanoacrylate produces minimal local tissue inflammation in mammals. The $-CH_2CF_3$ group-containing monomer, 2,2,2-trifluoroethyl cyanoacrylate, while exhibiting a relatively higher degree of inflammatory tissue response in subcutaneous tissues of mice, was completely biodegraded by the exposed surface of partially excised rat livers within sixteen weeks after application of the monomer. The degree of local inflammation caused by the latter monomer, however, is still less than that caused by methyl 2-cyanoacrylate as determined by gross and microscopic examinations.

In most bonding applications employing monomers of the invention, polymerization is catalyzed by small amounts moisture on the surface of the adherends. Thus a drop of monomer can be placed on the surface of e.g. one of two metal or glass pieces which are to be adhered and the other piece brought into contact therewith. A strong bond is soon formed by polymerization.

Similarly, desired bonding of tissues or hemostasis proceeds well in the presence of blood and other body fluids. The bonds formed are of adequate flexibility and strength to withstand normal movement of tissue. In addition, bond strength is maintained as natural wound healing proceeds concurrently with polymer assimilation.

Compositions of the invention are sterilizable by conventional methods such as distillation under aseptic conditions.

The method of repairing injured tissues with compositions of this invention (for example, to control bleeding) comprises, in general, sponging and subsequent application to the tissue of an adhesive composition containing a monomer of the invention which polymerizes to a thin film of polymer while in contact with said tissue surfaces. For bonding separate surfaces of body tissues, the monomer would be applied to at least one of such surfaces, and the surfaces brought quickly together while the monomer polymerizes in contact with both of the surfaces.

The monomers of the invention are effective in adhesive formulations with the fluoroalkyl 2-cyanoacrylates as the major active constituent. Thus, the cyanoacrylate may be combined in admixture with a polymerization-inhibitor (e.g. sulfur dioxide). One or more adjuvant substances, such as thickening agents, plasticizers, or the like, to improve the surgical utility of the monomer, can also be present.

Depending on the particular requirements of the user, these adhesive compositions can be applied by known means such as with a glass stirring rod, sterile brush or medicinal dropper; however, in many situations a pressurized aerosol dispensing package is preferred in which the adhesive composition is in solution with a compatible anhydrous propellant.

The monomers are readily polymerized to addition-type polymers and copolymers, which are generally optically clear (as films) and are thermoplastic and moldable at temperatures below their decomposition temperature. They can be shaped at temperatures in the range of 100° to 150° C.

The polymers have the general formula

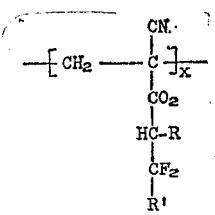

wherein R and R' are as defined above and $x$ is a number from 5 to 500.

Polymerization occurs by free radical initiation, exposure to small amounts of base, e.g. triethylamine, or water. The liquid monomer can be spread on e.g. a polyethylene surface and exposed to triethylamine to bring about polymerization to a coating which can be peeled from the polyethylene as a self-supporting, optically clear film.

The monomers of the invention can be copolymerized with other acrylates or epoxides.

The preferred method for preparing high purity (95 percent or greater) fluoroalkyl 2-cyanoacylates comprises catalyzing the condensation of formaldehyde with esters of cyanoacetic acid by means of a mixture of an acid and the acidic salt of an alkyl primary or secondary amine.

With particular reference to the preparation of the fluoroalkyl 2-cyanoacrylate esters of the present invention, the preferred method of preparation employs the cyanoacetates corresponding to the desired cyanoacrylates (e.g. 2,2,2-trifluoroethyl cyanoacetate for 2,2,2-trifluoroethyl 2-cyanoacrylate). The cyanoacetate is reacted with formaldehyde or polymers thereof such as paraformaldehyde, excepting aqueous solutions of formaldehyde as typified by formalin. The reaction medium may be any suitable inert organic solvent capable of forming an azeotrope with water.

The essential feature of the synthesis is the particular combination of catalytic materials employed. Any acid salt of an alkyl primary or secondary amine and any free acid may be utilized as components of the catalytic mixture, provided they establish the necessary pH value as described in detail below.

All phases of the synthetic sequence are carried out under acidic conditions. A criterion for utility of the catalytic mixture selected is that it have a corrected pH value of not over pH 5. This pH value can be determined as follows:

The exact amounts of amine acid salt and free acid to be used in the condensation step are dissolved in 25 ml. of water, and the pH of the solution is measured. If the resulting pH value is 5 or less, the mixture will adequately catalyze the condensation reaction. When the mixture is soluble in water, this is the "corrected pH value."

Catalytic mixtures comprising organic acids which are not readily soluble in water may be dissolved in 25 ml. of an ethanol-water mixture; however, the measured pH must then be corrected as described by B. Gutbezehl and E. Grunwald in J. Am. Chem. Soc., 75, 565 (1953).

Both primary or secondary amine salt and free acid are always present. Glacial acetic or strong mineral acids such as hydrochloric acid or sulfuric acid are preferred. The amount of catalyst employed is not critical and may be varied. Ordinarily a small amount, e.g. 0.5 to 0.1 percent by weight, based on the weight of cyanoacetic ester, is adequate.

Other than employing the imine acid salt and free acid, the condensation of cyanocacetic esters with formaldehyde and the subsequent depolymerization process are carried out by methods similar to prior art methods.

The following examples will illustrate preferred embodiments of the invention. It will be understood, however, that the examples are included merely for the purposes of illustration and are not intended to limit the scope of the invention, unless otherwise specifically indicated. All parts are by weight unless otherwise specified, and the pressures are shown in millimeters of mercury.

Example 1.—Fluoroalkyl cyanoacetates

Fluoroalkyl cyanoacetates required as starting materials in the synthesis of fluoroalkyl 2-cyanoacrylates described in this invention are not available by simple esterification of cyanacetic acid. A general procedure for the special preparation of these materials from cyanoacetyl chloride on a large scale is given below.

A 5-l. three-necked, round-bottomed flask equipped with an efficient mechanical stirrer, large addition funnel and reflux condenser topped with a gas exit tube was charged with 1000 ml. of diethyl ether and 1042.5 g. of phosphorus pentachloride. This suspension was stirred and cooled in an ice bath. In a separate container, a solution of 425.5 g. (5.0 moles) of cyanoacetic acid in 1750 ml. of diethyl ether was dried over magnesium sulfate and filtered to remove drying agent. It was then added over a period of 3 to 7 minutes with good stirring to the cold suspension. (The exothermic reaction which occurs can be controlled by adjusting the rate of addition, but a rapid rate is essential for optimum yield.) The condenser was immediately replaced with a short head and condenser. Ether and phosphorus oxychloride were then distilled off under reduced pressure (aspirator) to afford crude cyanoacetyl chloride as an orange-red, mobile liquid. During this operation, the internal pot temperature was not allowed to exceed 55° C. This step is critical since higher temperatures will cause degradation of cyanoacetyl chloride and may induce exothermic and uncontrollable polymerization. Samples of cyanoacetyl chloride should be used directly after preparation and should not be stored.

The distillation apparatus was then removed from the flask and replaced with a reflux condenser topped with a gas exit tube. The selected fluoroalcohol was placed in the funnel and about one-third added to the crude cyanoacetyl chloride. If the reaction did not begin spontaneously as evidenced by evolution of hydrogen chloride, the mixture was heated to 55°–65° C.; the remaining fluoroalcohol was then added slowly to maintain a smooth reaction. After completion of addition, the mixture was stirred at 55°–65° C. until no more hydrogen chloride was evolved. The acidic product was transferred to a smaller flask and crudely distilled to afford fluoroalkyl cyanoacetate. Fractional redistillation provided pure fluoroalkyl cyanoacetate with yields in the range of 75–85 percent.

TABLE I

[Fluoroalkyl Cyanoacetates, $NCCH_2CO_2R$]

| R | B.P. (°C./mm.) | $n_D$ 25° |
|---|---|---|
| —$CH_2CF_3$ | 93/9 | 1.3692 |
| —$CH_2CF_2CF_3$ | 83–85/6 | 1.3546 |
| —$CH_2(CF_2)_2H$ | 71/0.25 | 1.3785 |
| —$CH_2(CF_2)_4H$ | 105–106/0.9 | 1.3585 |
| —$CH\begin{smallmatrix}CH_3\\CF_3\end{smallmatrix}$ | 96/13 | 1.3724 |

Example 2.—2,2,2-trifluoroethyl 2-cyanoacrylate

Six hundred milliliters of benzene, 167.1 g. (1.0 mole) of 2,2,2-trifluoroethyl cyanoacetate, 36.0 g. (1.2 moles) of powdered paraformaldehyde, 1.0 g. of piperidine hydrochloride and 0.2 ml. of glacial acetic acid were combined in a 1-l. two-necketd, round-bottomed flask equipped with mechanical stirrer, Dean-Stark water trap and reflux condenser. The heterogeneous mixture was stirred and heated under gentle reflux until all water formed during the reaction had been azeotropically removed and collected in the Dean-Stark trap. Only a portion of the poly (trifluoroethyl 2-cyanoacrylate) formed in the reaction separated; the remainder was precipitated by cooling the flask in an ice bath.

After the cold benzene had been decanted, 300 ml. of anhydrous acetone were added and warmed to dissolve polymer. The clear polymer solution was filtered (to remove piperidine hydrochloride and any unreacted paraformaldehyde) into a clean 1-l. two-necked, round-bottomed flask equipped with mechanical stirrer, and 100 g. of tricresyl phosphate were added to aid in fluidizing the mixture. Acetone was then removed by distillation. Pressure in the system was gradually reduced to 15–20 mm. Hg, and the bath temperature slowly raised to 110°–120° C. Last traces of acetone were eliminated by stirring the yellow, viscous mixture vigorously for 30 minutes under these conditions.

At this point, 6–10 g. of polyphosphoric acid and 0.5 g. of pyrogallol were added to serve as inhibitors, and the flask was equipped with a short take-off head fitted with a gas inlet tube mounted in the thermometer well. Thermal depolymerization was effected by heating this mixture under reduced pressure with good stirring while sulfur dioxide was bled into the system. Collection of monomeric 2,2,2-trifluoroethyl 2-cyanoacrylate in a Dry Ice-cooled receiver was begun when the bath temperature/system pressure reached 155° C./20 mm. and continued up to a maximum of 200° C./10 mm. Clear, colorless monomer obtained in this fashion is sufficiently pure for most adhesive applications; yield, 95 g. (53 percent based on 2,2,2-trifluoroethyl cyanoacetate).

Greater purity may be achieved by redistillation from a small amount of phosphorus pentoxide using a short Vigreux column. A sulfur dioxide bleed to serve as inhibitor and prevent anionic polymerization is essential during any such redistillation. On redistillation, the distillation cut boiling at 83°–84° C./13 mm. weighed 71 g. and was shown to be 95.8 percent pure 2,2,2-trifluoroethyl 2-cyanoacrylate.

Monomer purity was established by gas chromatography using a chromatograph equipped with a 6′ x ¼″ nitrile-containing silicone column packed on diatomaceous earth (of the type commercially available under the trade name "60/70 Anakrom ABS") and operated at column temperatures of 150°–190° C. Monomer samples were injected as 10 percent solutions in spectrograde nitromethane.

Polymeric 2,2,2-trifluoroethyl cyanoacrylate was formed by pouring the monomer into a large excess of rapidly stirred 1:1 methanol-water solution. The polymer precipitated in finely divided form and was removed by filtration, washed with methanol and dried. This was molded into disks at about 100°–125° C. which have useful dielectric properties. These disks can be machined and used as insulating washers. The polymer is soluble in acetone and films or coatings can be made from these solutions in the usual manner. These also have useful electrical insulating properties.

Example 3.—2-(1,1,1-trifluoro)propyl-2-cyanoacrylate

A 2-l. three-necked flask equipped with a mechanical stirrer and Dean-Stark water trap was charged with 438 g. (2.42 moles) 2-(1,1,1-trifluoro)propyl cyanoacetate, 96.0 g. (3.2 moles) powdered paraformaldehyde, 3.0 g. piperidine hydrochloride, 0.5 ml. glacial acetic acid and 900 ml. benzene. The mixture was stirred and slowly brought to reflux over a period of 3 hours. Heating under reflux was continued until no more water separated in the trap. The cooled solution of low molecular weight polymer was then filtered into a round-bottomed flask containing 240 g. tricresylphosphate. Benzene was then removed by distillation. Last traces of solvent were eliminated by stirring the mixture at 110° C./0.3 mm.

The distillation head was removed and replaced with a clean, dry one-piece head and condenser fitted with a gas inlet tube in the thermometer well. About 10 g. polyphosphoric acid were added to the orange syrupy mixture. Thermal depolymerization was effected by heating this mixture under reduced pressure while sulfur dioxide was bled into the system. Collection of crude monomeric 2-(1,1,1-trifluoro)propyl 2-cyanoacrylate in a Dry Ice-cooled receiver was begun when the bath temperature/system pressure reached 150° C./20 mm. and continued up to a maximum of 190° C./0.45 mm.; yield, 251 g. On redistillation of crude monomer from a small amount of phosphorus pentoxide as described in Example 1, the fraction boiling at 83°–85° C./17 mm. was shown to be at least 98 percent pure 2-(1,1,1-trifluoro)propyl cyanoacrylate. The monomer is converted to polymer by the procedure described in Example 1.

Examples of other 2-cyanoacrylates.—Other cyanoacrylates which have been prepared in a manner similar to that described in Examples 1 and 2 are collected in Table II.

TABLE II

Fluoroalkyl 2-cyanoacrylates

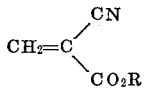

| R: | B.P. |
|---|---|
| —$CH_2(CF_2)_2H$ | 89–90°/0.3 mm. |
| —$CH_2(CF_2)_4H$ | 91–95°/0.2–0.4 mm. |
| —$CH_2CF_2CF_3$ | 98–100°/15 mm. |

These monomers can be polymerized in the same manner as described in Examples 1 and 2.

Example 4.—Hemostasis in vascular organs (excised cat spleen)

A male cat was anesthetized intravenously with pentobarbital-sodium and prepared for aseptic surgery. Prior to surgery 25 milligrams of heparin sodium USP were intravenously administered. The spleen was exteriorized through a ventral midline incision, and a disk-shaped portion of splenic tissue 1 to 2 centimeters in diameter and 3 to 5 millimeters deep was excised. Resulting profuse hemorrhage from the wound was controlled by occluding the blood supply to the spleen with soft clamps and gauze sponging. A thin layer of 2,2,2-trifluoroethyl 2-cyanoacrylate adhesive monomer was applied to the wound surface immediately thereafter by spraying with an aerosol at a distance of from 4 to 8 centimeters from the wound surface. After allowing sufficient time for polymerization of the monomer, the organ was replaced in the peritoneal cavity. The ventral midline incision was closed using conventional sutures. Post-operative antibiotics and vitamins were routinely administered. Adhesive and hemostatic properties were recorded at the time of application.

The cat, except for depression during the first few post-operative days, made an uneventful recovery and remained healthy until sacrificed six weeks after surgery. Adhesions between the spleen and surrounding tissue, an expected sequela following surgery of this nature, and mild inflammation of the splenic capsule were the only gross tissue changes observed at necropsy. None of the adhesive was grossly visible and normal healing appeared to be in progress.

What is claimed is:

1. 2-(1,1,1-trifluoro)propyl 2-cyanoacrylate.
2. 1,1,3-trihydroperfluoropropyl 2-cyanoacrylate.
3. 1,1,5-trihydroperfluoropentyl 2-cyanoacrylate.
4. 1,1-dihydroperfluoropropyl 2-cyanoacrylate.
5. Composition according to claim 1 comprising additionally sulfur dioxide as polymerization inhibitor.
6. Composition according to claim 2 comprising additionally sulfur dioxide as polymerization inhibitor.
7. Composition according to claim 3 comprising additionally sulfur dioxide as polymerization inhibitor.
8. Composition according to claim 4 comprising additionally sulfur dioxide as polymerization inhibitor.
9. A thermoplastic addition homopolymer of the monomer of claim 1 having the general formula:

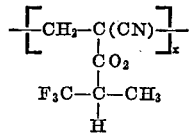

wherein $x$ is 5 to 500.

10. A thermoplastic addition homopolymer of the monomer of claim 2 having the general formula:

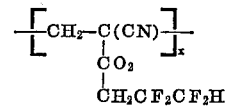

wherein $x$ is 5 to 500.

11. A thermoplastic addition homopolymer of the monomer of claim 3 having the general formula:

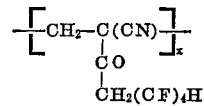

wherein $x$ is 5 to 500.

12. A thermoplastic addition homopolymer of the monomer of claim 4 having the general formula:

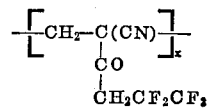

wherein $x$ is 5 to 500.

References Cited

UNITED STATES PATENTS

| | | | |
|---|---|---|---|
| 2,765,332 | 10/1956 | Coover et al. | 260—465.4 |
| 2,784,127 | 3/1957 | Joyner et al. | 260—88.7 |
| 2,794,788 | 6/1957 | Coover et al. | 260—88.7 |
| 3,275,462 | 9/1966 | Strobel et al. | 260—465.4 |
| 3,255,059 | 6/1966 | Hamermesh et al. | 149—22 |
| 3,223,083 | 12/1965 | Cobey | 260—78.4 N |
| 3,282,773 | 11/1966 | Wicker et al. | 260—78.4 N |
| 3,360,124 | 12/1967 | Stonehill | 260—78.4 N |
| 3,483,870 | 12/1969 | Coover et al. | 260—78.4 N |

HARRY WONG, Jr., Primary Examiner

U.S. Cl. X.R.

117—124, 132, 138.8; 128—156; 260—32.8, 78.5, 465.4